United States Patent
O'Donnell et al.

(10) Patent No.: US 6,873,718 B2
(45) Date of Patent: Mar. 29, 2005

(54) SYSTEM AND METHOD FOR 3D STATISTICAL SHAPE MODEL FOR THE LEFT VENTRICLE OF THE HEART

(75) Inventors: Thomas O'Donnell, New York, NY (US); Hui Luo, Rochester, NY (US)

(73) Assignee: Siemens Corporate Research, Inc., Princeton, NJ (US)

( * ) Notice: Subject to any disclaimer, the term of this patent is extended or adjusted under 35 U.S.C. 154(b) by 586 days.

(21) Appl. No.: 09/975,810

(22) Filed: Oct. 12, 2001

(65) Prior Publication Data

US 2003/0097219 A1 May 22, 2003

(51) Int. Cl.[7] ................................................ G06K 9/00
(52) U.S. Cl. ....................................... 382/131; 382/284
(58) Field of Search ................................ 382/128, 131, 382/132, 284, 294, 298; 128/922; 600/416, 481, 508; 378/62

(56) References Cited

U.S. PATENT DOCUMENTS

| | | | | |
|---|---|---|---|---|
| 5,435,310 A | * | 7/1995 | Sheehan et al. | 128/653.1 |
| 5,601,084 A | * | 2/1997 | Sheehan et al. | 128/661.04 |
| 5,923,770 A | * | 7/1999 | O'Donnell et al. | 382/131 |
| 2003/0053667 A1 | * | 3/2003 | Paragios et al. | 382/128 |

* cited by examiner

*Primary Examiner*—Andrew W. Johns
(74) *Attorney, Agent, or Firm*—Donald B. Paschburg; F. Chau & Associates, LLP

(57) ABSTRACT

A method for the generation of a 3D statistical shape model for a left ventricle of a heart generating an average left ventricle by aligning the datasets, selecting landmarks, and setting weights expressing confidence for each landmark, and determining a statistical model from a set of aligned shape model by principle component analysis.

19 Claims, 2 Drawing Sheets

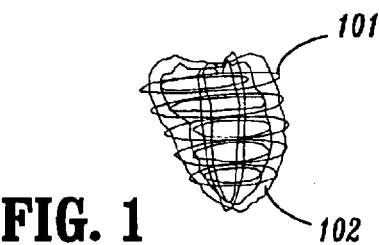
FIG. 1
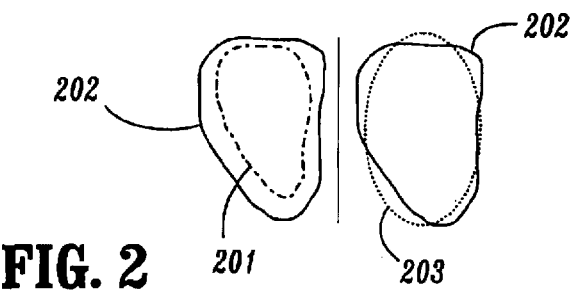
FIG. 2
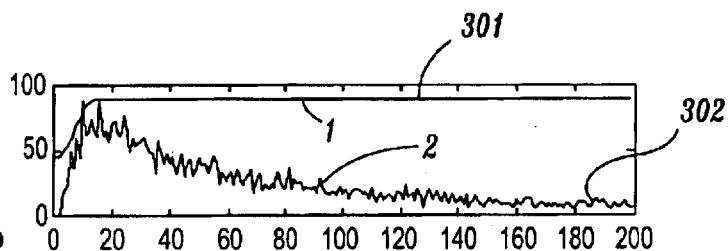
FIG. 3
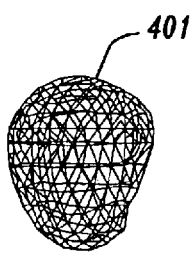     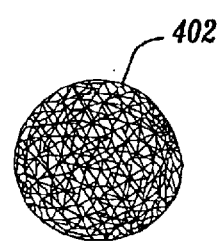     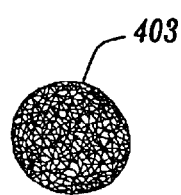     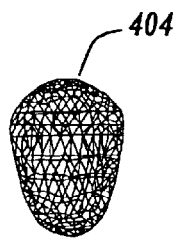
FIG. 4a        FIG. 4b        FIG. 4c        FIG. 4d
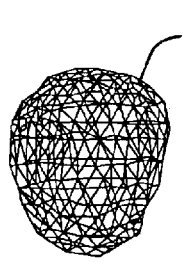     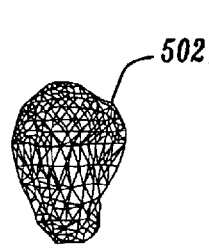     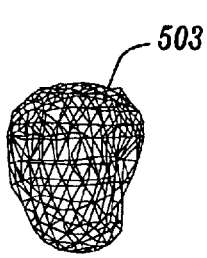     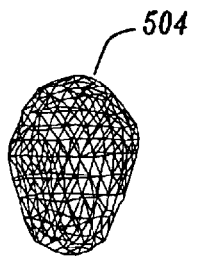
FIG. 5a        FIG. 5b        FIG. 5c        FIG. 5d

SYSTEM AND METHOD FOR 3D STATISTICAL SHAPE MODEL FOR THE LEFT VENTRICLE OF THE HEART

BACKGROUND OF THE INVENTION

1. Field of the Invention

The present invention relates to cardiac modeling, and more particularly to a method for creating a 3-D statistical shape model of the left ventricle from sets of sparse 2-D contour inputs.

2. Discussion of Prior Art

Statistical Shape models are powerful tools for morphological analysis and object recovery. They may be employed in classification by standing as a point of comparison, which embodies the common characteristics of a group, DeQuardo J R. et. al., relationships of neuroanatomic landmarks in schizophrenia. *Psychiatry Research.* 67(1):81–95, 1996 May 31. Statistical Shape models may also be used as the basis for prediction. Given a set of views of an object, Statistical Shape models allow the morphology of unobserved regions to be inferred, Fleute M, Lavallee S. Nonrigid 3-D/2-D registration of images using statistical models. *MICCAI'99* Springer-Verlag. 1999, pp.138–47. Berlin, Germany. Indeed, statistical shape models have been used to determine features other than shape, such as volume, based on extrapolation from limited observations, Ruff C F, Bhalerao A, Hughes S W, D'Arcy T J, et. al., The estimation of fetal organ volume using statistical shape analysis. *Computer Assisted Radiology.* 1996, pp.280–5. Anatomical atlases, which provide physicians and surgeons with roadmaps to the body, are another incarnation of these models. In object segmentation, statistical models may serve as a prior in a probabilistic formulation of the task, Gonzalez B et. al., Combined statistical and geometrical 3D segmentation and measurement of brain structures. *Workshop on Biomedical Image Analysis* 1998, pp.14–23, or form the basis for constraining possible resultant deformations.

There has been a great deal of work in recent years on developing statistical shape models for morphological analysis, Bookstein F L. Shape and the information in medical images: a decade of the morphometric synthesis. [Journal Paper] *CVIU*, vol.66, no.2, May 1997, pp.97–118, Cootes T F, et. al., Flexible 3D models from uncalibrated cameras. *Image & Vision Computing*, vol.14, no.8, August 1996, pp.581–7.

Some work focuses on the problem of generating a dense set of landmarks semi-automatically. Fleute and Lavallee rigidly map several training examples of a femur to a densely sampled template instance, then use the inversions of these mappings to obtain corresponding points on each of the examples.

Lorenz and Krahnstover automatically locate candidates for landmarks via a metric for points of high curvature, Lorenz C, Krahnstover N. Generation of point-based 3D statistical shape models for anatomical objects. *CVIU*, vol.77, no.2, February 2000, pp.175–91. This method is not applicable to the heart because the LV of the hearts lacks such features.

Brett and Taylor merge decimated polygonal representations of objects in a tree-like fashion, Brett A D, Taylor C J. A method of automated landmark generation for automated 3D PDM construction. *Image & Vision Computing*, vol.18, no.9, June 2000, pp.739–48. Associations are made between objects via a symmetric Iterative Closest Point (ICP) algorithm. The ICP algorithm calls for re-mapping the polygonal structures.

Kelemen, Szekely and Gerig express their statistical shape models in terms of spherical harmonics and include the pose of the organ under study as part of the model, Kelemen A, et. al., Three-dimensional model-based segmentation of brain MRI. *Workshop on Biomedical Image Analysis IEEE Comput. Soc.* 1998, pp.4–13.

However, the prior art does not take into account the lack of identifiable landmarks and sparse inputs. Therefore, a need exists for a system and method for creating a 3-D statistical shape model of the left ventricle from sets of sparse 2-D contour inputs.

SUMMARY OF THE INVENTION

According to an embodiment of the present invention, a method is provided for the generation of a 3D statistical shape model for a left ventricle of a heart. The method includes generating an average left ventricle by aligning the datasets, selecting landmarks, and setting weights expressing confidence for each landmark, and determining a statistical model from a set of aligned shape model by principle component analysis.

According to an embodiment of the present invention, a method is provided for the generation of a 3D statistical shape model for a left ventricle of a heart. The method includes creating a template model, aligning a plurality of left ventricle contour datasets, and assigning a plurality of landmarks to the datasets. The method further includes averaging the landmarks, and determining a statistical model from a plurality of aligned shape models.

Creating the template model further comprises determining a pose of the left ventricle according to a short axis and a lateral-to-septal-wall direction, and positioning a plurality of models in the dataset according to the pose. The method includes fitting each model to a contour data, wherein the pose and a parametric component can change, and averaging the parametric component for each model to create the template model.

Aligning further comprises the step of aligning the dataset to the template model. Aligning the dataset to the template model further includes associating a plurality of individual contour points in each dataset with a corresponding model, isotropically scaling each model to fit the template model, and scaling the dataset to fit the template model.

Assigning the plurality of landmarks to the datasets further comprises the step of associating model surfaces using the template model.

Assigning the plurality of landmarks includes fitting, completely, a model to each dataset, and determining a point on each of a plurality of surfaces of the model which is closest to each of a plurality of nodes of the template model. The nodes are points wherein at least three polygons comprising the template model meet.

Averaging the landmarks includes determining a confidence of each landmark, scoring each confidence, and averaging the landmarks according to a membership function of a scored value of the corresponding confidences.

Statistical model is determined according to a principle component analysis.

According to an embodiment of the present invention, a program storage device is provided readable by machine, tangibly embodying a program of instructions executable by the machine to perform method steps for the generation of a 3D statistical shape model for a left ventricle of a heart. The method includes creating a template model, aligning a plurality of left ventricle contour datasets, and assigning a plurality of landmarks to the datasets. The method further includes averaging the landmarks, and determining a statistical model from a plurality of aligned shape models.

BRIEF DESCRIPTION OF THE DRAWINGS

Preferred embodiments of the present invention will be described below in more detail, with reference to the accompanying drawings:

FIG. 1 shows an LV dataset made up of five short axis image planes and two long axis image planes according to an embodiment of the present invention;

FIG. 2 shows a non-statistical model formation according to an embodiment of the present invention;

FIG. 3 is a graph showing the weight membership function according to an embodiment of the present invention;

FIGS. 4a–b show average models of an epicardial surface;

FIGS. 4c–d show average models of an endocardial surface;

FIG. 5a shows an epicardial surface in a first mode of variation by three standard deviations according to an embodiment of the present invention;

FIG. 5b shows an endocardial surface in a first mode of variation by three standard deviations according to an embodiment of the present invention;

FIG. 5c shows an epicardial surface in a second mode of variation by three standard deviations according to an embodiment of the present invention; and FIG. 5d shows an endocardial surface in a second mode of variation by three standard deviations according to an embodiment of the present invention.

DETAILED DESCRIPTION OF PREFERRED EMBODIMENTS

Figure 6:
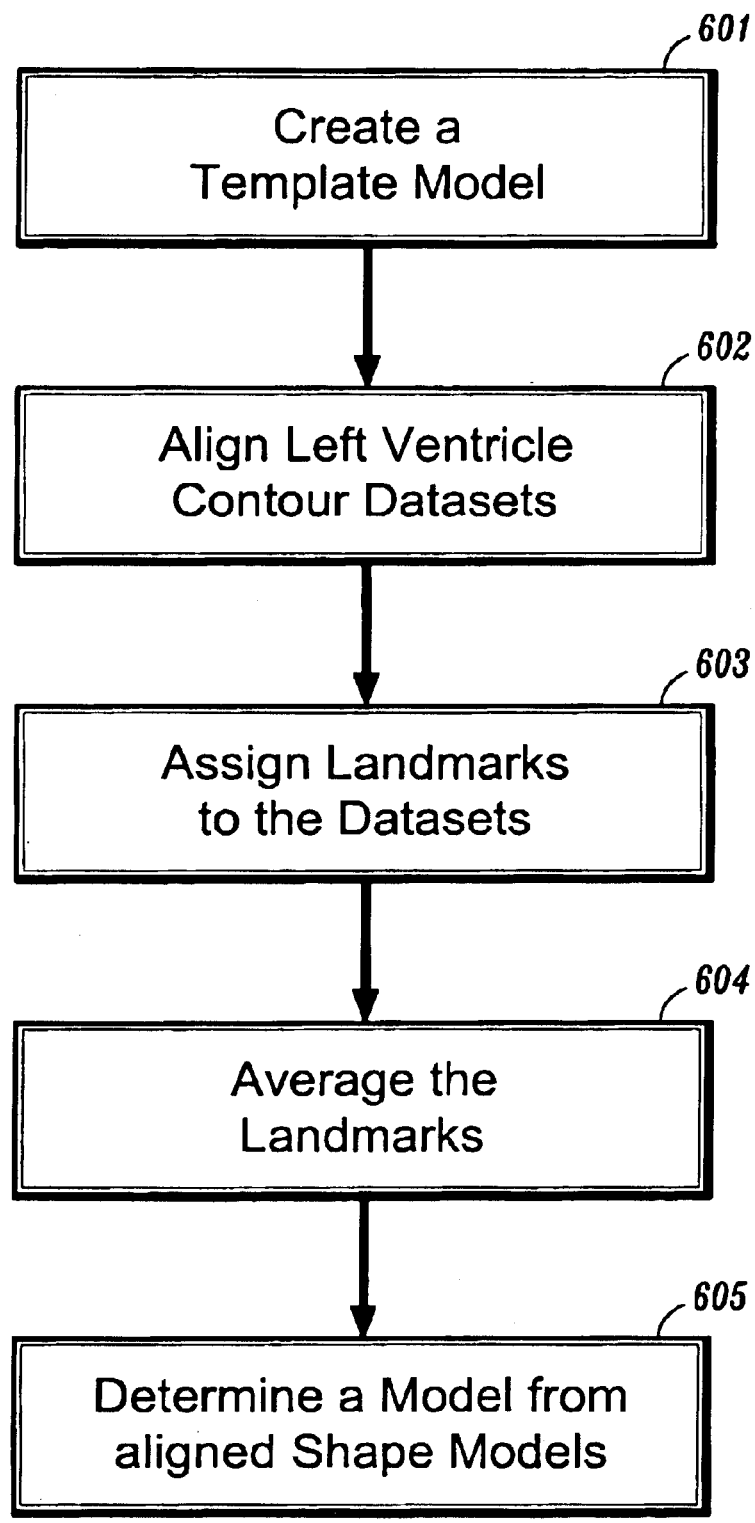
FIG. 6 is a flow diagram of the method for generation of a 3D statistical shape model for a left ventricle of a heart.

A method is proposed for developing a statistical shape model of the left ventricle (LV) of the heart. The present invention assumes the existence of a set of segmented LV instances culled from both patient and volunteer Magnetic Resonance (MR) datasets. The LVs were segmented using Siemens' ARGUS tool that draws two-dimensional (2-D) contours on individual image slices. Referring to FIG. 1, each MR dataset includes about, six to seven short axis slices, e.g., 101, and at least one long-axis slice, e.g., 102. The datasets provide sparse but adequate coverage of the LV, for example as shown in FIG. 1. Note that the positions of the image slices with respect to the LV can vary from dataset to dataset. Therefore, contours may delineate different sections of the LV and cannot be used directly as landmarks.

Given these inputs, in order to develop a statistical model of the LV, the method employs a user-defined landmark-based method. User-defined landmark-based methods can be challenging as well as time consuming because there may be very few distinct features in the underlying LV on which to specify such points. Further, since, the landmarks may not be directly delineated by the contours, the concept.

To address these concerns, according to an embodiment of the present invention, a dense set of landmarks is generated in a semi-automatic way. As mentioned, the LV has very few distinct, easily labeled points; however, there are several overall shape similarities expressed as regions of curvature. A model-based approach is implemented to interpolate between sparse contours and align the models using the overall shape. A dense set of new associations (landmarks) is generated between the model surfaces based on a distance metric. The landmarks are averaged using a weighted sum based on a landmark's proximity to its contours. A statistical shape model is generated by principle component analysis using these landmarks.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

According to an embodiment of the present invention, a model-based alignment for sparse inputs is provided and the weighting of landmarks which appropriately describe the reliability of each landmark's situation is determined.

The LV model formulation has two walls expressing the inner, endocardial, and outer, epicardial, surfaces. The LV model is described using a parametric component which is essentially ellipsoidal and can account for the overall shape of the LV and includes parameters such as apex-to-base length, epicardial lateral-wall radius and valve plane height, and a local spline-like mesh which deforms away from the parametric component and represents finer features. The spline-like meshes form the outer surfaces of the model. FIG. 2a shows both an inner wall 201 and an outer wall 202. In FIG. 2b the outer wall 202, a spline-like mesh deformation from a parametric component, and an underlying parametric component 203 are shown. The inner wall has the same configuration.

This model formulation has the advantage that it has a rough description of the object built into it, the parametric component. According to an embodiment of the present invention, this aspect of the model formulation can be exploited when aligning different model instances to create the average model.

When fitting to a dataset, the model is capable of deforming in various ways. The model may change its pose. The model may adjust the parametric component in order to change its general shape. In addion, the spline-like mesh may extend to describe any local features of the data. In the process of creating an average LV model the method, at different stages, makes use of all of these deformation modes.

The method creates a template model T, aligns the datasets making use of this template, fits models $M_i$ to each of the aligned datasets, makes associations (landmarks) between the model surfaces using the template model, and averages those landmarks to create a Procrustes mean shape.

For each of the n datasets, the user specifies the pose of the LV by determining the short axis and the lateral-to-septal-wall direction. A model, $L_i$, i=1 . . . n, is positioned in the data using this information. The model is fit to the contour data $D_i$, i=1 . . . n by allowing it to change its pose and parametric component. No local deformations are performed. Since the LV is largely rotationally symmetric about the short axis, there is little change in the pose of the model $L_i$ during the fit. Thus, the same parameters in different models will describe the same regions, e.g., the endocardial septal wall radius parameter will describe the endocardial septal wall radius in each of the models. The template model T is created by averaging the parameters of the parametric component of the models. The center of T is set to be the origin and its axes the coordinate axes.

To align the datasets, in summary, the method associates the individual contour points in each dataset $D_i$ with the corresponding model $L_i$. The method isotropically scales the models $L_i$ to fit to the single template T. This same scaling is applied to the dataset $D_i$. The method explicates:

The models are polygons expressed as nodes and edges. Let $N_{ij}=\{(x_{ij}, y_{ij}, z_{ij})\}$ j=1 . . . l be the nodes on model $L_i$ and $D_{ik}=\{(x_{ik}, y_{ik}, z_{ik})\}$ k=1 . . . m be a vector describing the points on a contour $D_i$, and. Each contour point's model-based coordinate $C_{ik}=\{(x_{ik}, y_{ik}, z_{ik})\}$ k=1 . . . m is defined as:

$$C_{ik} = \min_{j=1...l}(P_{ik} - N_{ij}) \quad (1)$$

Thus, $C_{ik}$ associates a contour datapoint with the model $L_i$ with the closest node $N_{ij}$. We term $N_i(D_{ij})$ to be the closest node so that $D_{ij}=C_{ik}+N_i(D_{ij})$.

A transformation H is searched for, which minimizes a sum of square Euclidean distance between each $L_i$ and T. This transformation composed a scaling s, a rotation $\bar{\theta}=\{\theta_x, \theta_y, \theta_z\}$ and a transformation $\bar{t}=(tx, ty, tz)$ is applied to the fitted model $L_i$ via its nodes $N_{ij}$.

$$H(N_{ij}) = sR(\bar{\theta})N_{ij} + \begin{bmatrix} t_x \\ t_y \\ t_z \end{bmatrix} \quad (2)$$

where $R(\bar{\theta})$ is the rotation operator. The best fit transformation may be found by minimizing the surface distance between the $L_i$ and the template T.

$$\min_{s,\theta,t} \left\| \sum_{j=1...l} (H(N_{ij}) - T)^2 \right\| \quad (3)$$

After the transformation, the size and pose of $L_i$, i=1 . . . n have been changed to best fit T. This transformation is applied to the contours. The new contour coordinates $D'_i$ are given by:

$$D'_{ik} = H(N_i(D_{ik})+C_{ik}) \quad (4)$$

Where $N_i(D_{ik})$ is the nearest model node coordinate of a contour point $D_{ik}$. At this point all the contour datasets $D'_i$ are aligned and centered around the template T.

To each dataset $D_i'$ a model $M_i$ is fit. This is a complete fit including changes to the model's pose, parametric component, and local mesh. This results in a set of closely fit models to the contour datasets.

To assign landmarks, recall that the template model T is expressed as a polygon made up of nodes and edges and that the models $M_i$ are centered around T. These nodes of T are used as the basis for the landmarks. For each node $T_j$ we find the closest point on each of the surfaces of model $M_i$.

$$R_{ij}(x, y, z)=\{S_i(x, y, z)|\text{Min}\|(S_i(x, y, z)-T_j)\|\} \text{ for } \forall S_i(x, y, z) \in M_i \quad (5)$$

Thus, each of the models $M_i$ has a set of l landmarks, $R_{ij}$, that are linked by being the closest points on each model to the nodes of the template T.

The landmark positions are averaged from all the models to create the average shape. Rather than taking a simple average, the method employs a weighted average. This is because the contour datasets from are not dense. Differing landmarks will have differing contour environments. Some landmarks will be surrounded by datapoints leading the method to have high confidence in their position with respect to the underlying LV. Others will fall on a region of the model surface, which is relatively devoid of datapoints. To express the confidence in the landmarks, the following formula is employed.

$$c_{ij} = \frac{\eta}{\sum_{m=1...\eta} \|D_{im} - R_{ij}\|^2 + \varepsilon} \quad (6)$$

where $\eta$ is the number of datapoints, $D_{im}$, for which $R_{ij}$ is the closest landmark. This value rewards landmarks with many datapoints for which it is the closest landmark and where the distance to the landmark is small.

However, directly using such confidence level as a weight to derive the average model seems impractical, because its value may range from 0 to more than 200, as shown in FIG. 3. If the method employs $c_{ij}$ directly in the weighted sum to derive the average model, some landmarks with higher weights may overreact, particularly in the presence of noisy data. To avoid such a situation, the confidence level is scored by a membership function. Fuzzy membership functions are selected. Therefore, the landmarks with high weights can have just enough of a contribution to the average model. More precisely, if a confidence level is high, it is said to have a high degree membership of contribution to the average model and set its membership as one; otherwise, its membership is set below one. The corresponding membership function is given by carefully studying the training data. The curve 301 in FIG. 3 gives the distribution of the confidence level of landmarks from fourteen training data sets. Based on our numerous experiments, the membership function is constructed using a Gaussian and uniform functions.

$$w_{ij} = \begin{cases} 0.5 + 0.5 * \frac{1}{\sqrt{2\pi}\,\sigma} e^{-\frac{1}{2}\left(\frac{x-th}{\sigma}\right)^2} & \text{if } c_{ij} \leq th \\ 1 & \text{if } c_{ij} > th \end{cases} \quad (7)$$

where th is a threshold derived from the distribution of the confidence level. The curve 302 in FIG. 3. shows the membership function defined in Eq. (7).

Having all landmarks and their corresponding confidences, the average model can be determined by:

$$\overline{R}_j = \frac{\sum_{i=1}^{n} w_{ij} R_{ij}}{\sum_{i=1}^{N} w_{ij}} \quad (8)$$

Where, $R_{ij}$ is the position of a landmark, $\overline{R}_j$ is the position of the landmarks in the average model.

Once the average LV shape model is obtained, the LV shape model variations can be analyzed by applying a principal component analysis on the training data. Each computed principal component gives a 'mode of variation', a way in which the landmark points tend to move together as the shape varies.

Each models' shape is given by j landmarks. Based on our 3D training models, we can calculate the 3j*3j covariance matrix S using $$S = \frac{1}{n} \sum_{j=1}^{t} (R_{ij} - \overline{R}_j)(R_{ij} - \overline{R}_j)^T \quad (9)$$

This matrix has some particularly useful properties, since it demonstrates variation in some directions more than in others. These variations' directions and importance may be derived from an eigen-decomposition of S by solving the equation (10)

$$S V_k = \ddot{e}_k V_k \quad (10)$$

The solutions to Eq.10 provide the eigenvector $V_k$ (k=1, 2, 3n) and their eigenvalues $\ddot{e}_k$ of S. Conventionally, we assume $\ddot{e}_i \geq \ddot{e}_{i+1}$. It can be shown that the eigenvectors associated with larger eigenvalues correspond to the directions of larger variation in the underlying training data.

Note that any shape in the training set can be approximated using the mean shape and a weighted sum of these deviations obtained from the first t modes. Where b=($b_1$, $b_2$, $b_3$, . . . $b_t$) is the vector of weights, which indicates how much variation is exhibited with respect to each the eigenvectors.

The method according to a preferred embodiment of the invention was used to generate a 3D statistical LV model from a pool of fourteen subjects as shown in FIGS. 4a–d. FIG. 4a shows a side view of an epicardial surface, FIG. 4b shows a top view of the epicardial surface. FIG. 4c shows a top view of an endocardial surface, FIG. 4d shows a side view of the endocardial surface. Each dataset is created by a user delineating the endocardial and epicardial boarders.

Table 1 illustrates the relative contribution of the most influential components. From this more than 90% of the shape variation can be captured by the first ten eigenvectors.

TABLE 1

| Index | (λi/λ total) | Cumulative total |
|---|---|---|
| 1 | 41.3769% | 41.3769% |
| 2 | 10.4376% | 51.8144% |
| 3 | 9.0261% | 60.8406% |
| 4 | 7.5134% | 68.3540% |
| 5 | 6.2111% | 74.5651% |
| 6 | 4.0443% | 78.6094% |
| 7 | 3.9312% | 82.5406% |
| 8 | 3.4228% | 85.9634% |
| 9 | 3.0939% | 89.0573% |

TABLE 1-continued

| Index | (λi/λ total) | Cumulative total |
|---|---|---|
| 10 | 2.7707% | 91.8280% |
| 11 | 2.4029% | 94.2309% |
| 12 | 2.0720% | 96.3029% |

FIGS. 5a–d shows front and top views of reconstructed shapes obtained by varying the first two model parameters (b1, b2). In particular, FIG. 5a shows a first mode of variation by three standard deviations for an epicardial surface, and FIG. 5b shows a first mode of variation by three standard deviations for an endocardial surface. Further, FIG. 5c shows a second mode of variation by three standard deviations for the epicardial surface, and FIG. 5d shows a second mode of variation by three standard deviations for the endocardial surface. The first eigenvector, which accounts for more than 40% of the variation seen in the data, captures the size information of LV. The second parameter varies the appearance of upper part of LV. All other higher modes show asymmetric properties of LV shapes.

Referring to FIG. 6, the method for the generation of a 3D statistical shape model for a left ventricle of a heart, includes creating a template model 601, aligning a plurality of left ventricle contour datasets 602, and assigning a plurality of landmarks to the datasets 603. The method further includes averaging the landmarks 604, and determining a statistical model from a plurality of aligned shape models 605.

A method for the generation of a 3D statistical shape model for left ventricle of heart is provided. Given a set of sparse LV contour datasets, the method generated the average LV by aligning the datasets, selecting landmarks, and setting weights expressing confidence for each landmark. Further, the method derived a statistical model from a set of aligned shape model by principle component analysis. This method has been successfully applied to a set of fourteen LV data sets. As expected, a large portion of total shape variability is captured within the first few eigenvectors.

Having described embodiments for generating a 3D statistical shape model for the left ventricle of the heart, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for generating a 3D statistical shape model for a left ventricle of a heart comprises the steps of:

generating an average left ventricle by aligning a plurality of datasets, selecting landmarks, and setting weights expressing confidence for each landmark; and determining a statistical model from a set of aligned shape model by principle component analysis.

2. A method for generating a 3D statistical shape model for a left ventricle of a heart comprises the steps of:

creating a template model;

aligning a plurality of left ventricle contour datasets;

assigning a plurality of landmarks to the datasets;

averaging the landmarks; and determining a statistical model from a plurality of aligned shape models.

3. The method of claim 2, wherein the step of creating the template model further comprises the steps of:
- determining a pose of the left ventricle according to a short axis and a lateral-to-septal-wall direction;
- positioning a plurality of models in the dataset according to the pose;
- fitting each model to a contour data, wherein the pose and a parametric component can change; and
- averaging the parametric component for each model to create the template model.

4. The method of claim 2, wherein the step of aligning further comprises the step of aligning the dataset to the template model.

5. The method of claim 4, wherein the step of aligning the dataset to the template model further comprises the steps of:
- associating a plurality of individual contour points in each dataset with a corresponding model;
- isotropically scaling each model to fit the template model; and
- scaling the dataset to fit the template model.

6. The method of claim 2, wherein the step of assigning a plurality of landmarks to the datasets further comprises the step of associating model surfaces using the template model.

7. The method of claim 2, wherein the step of assigning landmarks further comprises the steps of:
- fitting, completely, a model to each dataset; and
- determining a point on each of a plurality of surfaces of the model which is closest to each of a plurality of nodes of the template model.

8. The method of claim 7, wherein the nodes are points wherein at least three polygons comprising the template model meet.

9. The method of claim 2, wherein averaging the landmarks further comprise the steps of:
- determining a confidence of each landmark;
- scoring each confidence; and
- averaging the landmarks according to a membership function of a scored value of the corresponding confidences.

10. The method of claim 2, wherein the statistical model is determined according to a principle component analysis.

11. A program storage device readable by machine, tangibly embodying a program of instructions executable by the machine to perform method steps for generating a 3D statistical shape model for a left ventricle of a heart, the method steps comprising:
- creating a template model;
- aligning a plurality of left ventricle contour datasets;
- assigning a plurality of landmarks to the datasets;
- averaging the landmarks; and
- determining a statistical model from a plurality of aligned shape models.

12. The method of claim 11, wherein the step of creating the template model further comprises the steps of:
- determining a pose of the left ventricle according to a short axis and a lateral-to-septal-wall direction;
- positioning a plurality of models in the dataset according to the pose;
- fitting each model to a contour data, wherein the pose and a parametric component can change; and
- averaging the parametric component for each model to create the template model.

13. The method of claim 11, wherein the step of aligning further comprises the step of aligning the dataset to the template model.

14. The method of claim 13, wherein the step of aligning the dataset to the template model further comprises the steps of:
- associating a plurality of individual contour points in each dataset with a corresponding model;
- isotropically scaling each model to fit the template model; and
- scaling the dataset to fit the template model.

15. The method of claim 11, wherein the step of assigning a plurality of landmarks to the datasets further comprises the step of associating model surfaces using the template model.

16. The method of claim 11, wherein the step of assigning landmarks further comprises the steps of:
- fitting, completely, a model to each dataset; and
- determining a point on each of a plurality of surfaces of the model which is closest to each of a plurality of nodes of the template model.

17. The method of claim 16, wherein the nodes are points wherein at least three polygons comprising the template model meet.

18. The method of claim 11, wherein averaging the landmarks further comprise the steps of:
- determining a confidence of each landmark;
- scoring each confidence; and
- averaging the landmarks according to a membership function of a scored value of the corresponding confidences.

19. The method of claim 11, wherein the statistical model is determined according to a principle component analysis.

* * * * *